United States Patent Office 3,644,284
Patented Feb. 22, 1972

3,644,284
ELASTOMERIC COMPOSITION CONTAINING
POLYESTER STABILIZERS
Richard D. Cassar, West Chester, Pa., and Jackson S.
Boyer, Northridge, Claymont, Del., assignors to Sun
Oil Company, Philadelphia, Pa.
No Drawing. Filed Mar. 10, 1969, Ser. No. 805,874
The portion of the term of the patent subsequent to
Feb. 9, 1988, has been disclaimed
Int. Cl. C08c 27/66; C08f 45/58
U.S. Cl. 260—45.85 R                     14 Claims

ABSTRACT OF THE DISCLOSURE

An elastomeric composition having improved resistance to ultraviolet initiated degradation comprising an elastomer containing an ultraviolet stability improving quantity of a polyester of a polymethylated muconic acid selected from the group consisting of $\alpha,\beta'$-dimethylmuconic acid, $\alpha,\alpha'$-dimethylmuconic acid, $\alpha,\alpha',\beta$-trimethylmuconic acid, $\alpha,\beta,\beta'$-trimethylmuconic acid, $\alpha,\alpha',\beta,\beta'$-tetramethylmuconic acid and mixtures thereof with a polyethylene glycol of a molecular weight in the range of 100 to 1000, said polyester having a molecular weight in the range of 600 to 20,000.

CROSS REFERENCES TO RELATED APPLICATIONS

The present application is related to applicants' following copending applications: Ser. No. 691,129 of Jackson S. Boyer and Richard D. Cassar, filed Dec. 18, 1967 entitled "Alpha-Olefin Polymers Having Improved Ultraviolet Stability" and now U.S. Pat. 3,511,806 issued May 12, 1970; Ser. No. 691,153 of Jackson S. Boyer and Richard D. Cassar filed Dec. 18, 1967 entitled "Ultraviolet Stabilized Petroleum Hydrocarbons" and U.S. Pat. 3,518,196 issued June 30, 1970; Ser. No. 691,199 of Jackson S. Boyer and Richard D. Cassar filed Dec. 18, 1967 entitled "Ultraviolet Stabilized Elastomeric Compositions"; Ser. No. 758,574 of Jackson S. Boyer and Richard D. Cassar filed Sept. 9, 1968 entitled "Polymethylated Muconic Acids and Phosphite Ester Synergistic Stabilizer Combination for Elastomer Compositions" and now U.S. Pat. 3,518,225 issued June 30, 1970; Ser. No. 731,619 of Jackson S. Boyer and Richard D. Cassar filed May 23, 1968 entitled "Stabilized Latex Emulsions" now U.S. Pat. 3,544,502; and Ser. No. 777,476 of Jackson S. Boyer and Richard D. Cassar filed Nov. 20, 1968 entitled "Plastic Surface Coverings of Improved Ultraviolet Stability," now U.S. Pat. 3,541,047 each of which discloses ultraviolet stability improved compositions containing polymethylated muconic acids and their hydrocarbyl esters. The present application is also related to applicants' copending U.S. applications Ser. No. 805,835 entitled "Alpha-Olefin Composition Containing Polyester Stabilizers" now U.S. Pat. 3,562,209; Ser. No. 805,871 entitled "Elastomeric Composition Containing Phosphite Ester and Polyester Stabilizers" now U.S. Pat. 3,562,210; Ser. No. 805,872 entitled "Plastic Surface Coverings Containing Polyester Stabilizers" now U.S. Pat. 3,562,211; and Ser. No. 805,819 entitled "Petroleum Hydrocarbons Containing Polyester Stabilizers," each of which are filed of even date herewith.

BACKGROUND OF THE INVENTION

The present invention relates to the improvement of ultraviolet stability of elastomers and particularly to modified rubber compositions normally subject to degradation and discoloration resulting from exposure to ultraviolet light.

Specifically, this invention relates to novel elastomer compositions containing specific additives which provide improved ultraviolet stable elastomer compositions and to methods of their preparation.

In the past there has been a considerable problem concerning the effect of ultraviolet light on elastomers particularly to modified rubber compositions, most noticeably in an oxygen atmosphere containing small amounts of ozone. UV exposure under these conditions usually results in undesirable changes in the elastomer composition. Although there is some controversy as to the exact mechanism involved in the ultraviolet initiated change, most agree that this change represents some form of oxidation of the material affected.

In most applications, elastomer compositions normally are subject to exposure to ultraviolet light, either from sunlight or from artificial sources. Ultraviolet degradation in elastomers is usually noticeable in the form of crazing, cracking, or discoloration of the surfaces of the article. These effects are particularly noticeable on light-colored pigmented compositions, e.g., white sidewalls of tires. UV degradation ultimately contributes to the loss of the attractive appearance of the elastomer as well as a loss in some physical properties thereby providing possible unsafe usage of the elastomeric composition.

It has been reported by H. A. Winkelman in Industrial and Engineering Chemistry, vol. 44, No. 4, pp. 841–850, that deterioration of rubber products outdoors due to the action of sunlight and ozone is a problem of major concern to all manufacturers and consumers of rubber products. Automotive manufacturers each year face losses aggregating into thousands of dollars because of premature cracking and failure of rubber parts.

Recent advances in rubber technology are contributing to the development of long-life rubber compositions particularly suitable for use in automobile and truck tires. Primarily, these advances have been made in the development of abrasive-resistant treads which theoretically double the milage life of a tire. However, although the abrasive-resistance properties of tire treads have been substantially improved, the inherent susceptibility of elastomers to break down resulting from exposure to ultraviolet light remains an ever-present weakness. This weakness presents a primary limiting factor in the life of an automobile or truck tire or any of the many applications for which rubber is used.

Many organic rubber stabilizers such as N-isopropyl-N'-phenyl - p - phenylene diamine, N - phenyl - N' - cyclohexyl - p - phenylene diamine, 6-ethoxy-1,2-dihydro-2,2,4-trimethyl quinoline, N,N'-di(1-methylheptyl)-p-phenylene diamine, and diphenyl-p-phenylene diamine homologs are presently being added to rubber compounds prior to molding and vulcanization to inhibit UV degradation. However, some of these additives either provide only limited protection or have staining characteristics which render them undesirable for many commercial applications.

DESCRIPTION

It has now been discovered that a blend of elastomers and new polyesters derived from certain polymethylated muconic acids or their $C_1$ to $C_{20}$ hydrocarbyl esters copolymerized with polyethylene glycols provide an elastomeric composition having improved resistance to ultraviolet initiated degradation.

The ultraviolet stability improving additives found to be suitable for use in the compositions of the present invention are polyesters of polymethylated muconic acids with a polyethylene glycol of molecular weight in the range of 100 to 1000. The polyesters are characterized as being normally liquid at room temperature and having a molecular weight in the range of 600 to 20,000. The ultraviolet stability improving additive is preferably present in the elastomer compositions of the present invention in the quantity of 0.1 to 20.0 weight percent based on the weight of the whole composition. The more preferred concentration of ultraviolet stability improving additive is 2.0 to 10.0 weight percent based on the weight of the whole composition.

Polymethylated muconic acids that can be used in preparing polyesters suitable for use in the compositions of the present invention includes the cis-cis, cis-trans and trans-trans isomers of α,α'-dimethylmuconic acid, α,β'-dimethylmuconic acid, α,α',β-trimethylmuconic acid, α,β,β' - trimethylmuconic acid, α,α',β,β' - tetramethylmuconic acid and their monoesters wherein one carboxyl group is attached to a $C_1$ to $C_{20}$ hydrocarbyl radical, or their diesters wherein each carboxyl group is attached to a $C_1$ to $C_{20}$ hydrocarbyl radical, and mixtures thereof.

The $C_1$ to $C_{20}$ hydrocarbyl esters included in the present invention are selected from the hydrocarbyl radicals of $C_1$ to $C_{20}$ hydrocarbons having acyclic, cyclic, and aromatic structures such as those disclosed in the text "Handbook of Hydrocarbons," S. W. Ferris, Academic Press, Inc., New York, N.Y. (1955), pp. 145–249, all of which are incorporated herein by reference. The preferred esters of the present invention are the $C_1$ to $C_{10}$ hydrocarbyl mono- and di-esters of the polymethylated muconic acids disclosed above. Examples of the $C_1$ to $C_{10}$ hydrocarbyl groups include methyl, ethyl, butyl, pentyl, hexyl, heptyl, octyl, nonyl, decyl cyclopentyl, methyl cyclopentyl, dicyclopentyl, cyclohexyl, phenyl, tolyl, xylyl, tetrahydronaphthyl, decahydronaphthyl, as well as the various isomers of each.

The diester of the muconic acid can be a mixed ester. An illustrative example is the cis-cis isomer of α,α'-dimethylmuconic acid which can be illustrated by the following structural formula:

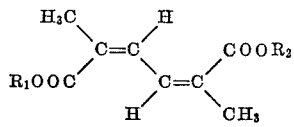

wherein $R_1$ is different from $R_2$. That is to say, $R_1$ can be a hydrocarbyl group of $C_1$ to $C_{20}$ and $R_2$ can be a different hydrocarbyl group of $C_1$ to $C_{20}$, e.g., $R_1$ equals cyclohexyl ($C_6$) and $R_2$ equals eicosyl ($C_{20}$).

Examples of some of the esters of the polymethylated muconic acids that can be used to prepare the polyesters suitable for use in the compositions of the present invention include the cis-cis, cis-trans and trans-trans isomers of the mono- and di-methyl esters of α,β'-dimethylmuconic acid; the mono- and diphenyl esters of α,α',β,β' - tetramethylmuconic acid; the mono- and dinaphthyl esters of α,β,β' - trimethylmuconic acid; the mono- and di-5,6 - diethylacenaphthyl esters of α,α'-dimethylmuconic acid; the mono- and di-cyclohexyl ester of α,α'-dimethylmuconic acid; the mono- and di-1,2-dimethylcycloheptyl esters of α,β'-dimethylmuconic acid; the mono- and di-decahydronaphthyl esters of α,α',β,β'-tetramethylmuconic acid; the mono- and di - 1,3 - dipropylbenzyl esters of α,α ' -dimethylmuconic acid; the mono- and di-2,9-dimethyl-4,7-diisobutyldecyl esters of α,α',β - trimethylmuconic acid; and the mono- and dianthracyl esters of α,β'-dimethylmuconic acid; mono- and di - 2,6,10 - trimethyl decyl esters of α,α',β,β'-tetramethylmuconic acid; and the nonyl ethyl esters of α,α',β-tetramethylmuconic acid.

As noted above, polymethylated muconic acids can exist in three isomeric forms, viz. cis-cis, trans-trans and cis-trans. As an example, the unsaturated diacid, α,α'-dimethylmuconic acid, can be depicted by the following structural formulas:

cis-cis

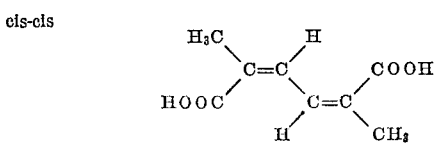

trans-trans

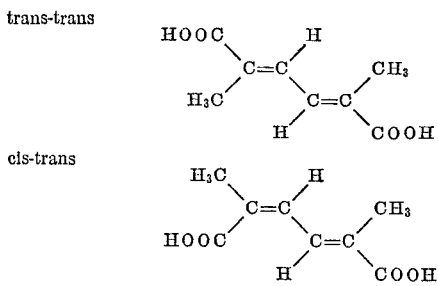

cis-trans

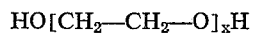

The preparation of each of these isomeric forms of the α,α'-dimethylmuconic acid has been described in the prior art by Elvidge et al., J. Chem. Soc., pp. 1026–1033 (1952). These authors show that oxidation of p-xylenol by means of peracetic acid gave the cis-cis form of the acid. The other isomeric forms were obtained indirectly by conversion of the cis-cis form. Also dimethyl esters of each of the three isomeric forms were prepared by shaking the respective DMMA with ethereal diazomethane.

The cis-cis form of polymethylated muconic acids can also be obtained by biological oxidation of p-xylene utilizing special strains of microorganisms as disclosed in United States Patent No. 3,383,289 of Raymond et al. issued May 14, 1968.

Procedures for recovering esters of the three isomeric forms of methylated muconic acids usable in the compositions of the present invention are also disclosed in United States patent application Ser. No. 561,736, filed June 30, 1966 now U.S. Pat. 3,440,158.

Polyethylene glycols suitable for use in preparing the polyester stabilizers of the present invention are generally represented by the structural formula:

$$HO[CH_2—CH_2—O]_xH$$

where $x$ equals any value in the range of 2 to 22. These polyethylene glycols are normally liquid at 25° C. and have a molecular weight in the range of 100 to 1000. Polyethylene glycols are well known standard articles of commerce. One method of preparing polyethylene glycols is disclosed in the text "Chemistry of Organic Compounds," Noller, Carl R., 2nd edition, W. B. Saunders Co., Philadelphia, Pa. (1958), p. 742. One method of preparing the polyesters herein disclosed is provided in U.S. Pat. No. 3,429,949 issued Feb. 25, 1969 to Gary L. Driscoll. Also examples of polyester compositions suitable for use in the elastomeric compositions of the present invention and methods of their preparation are disclosed in U.S. patent application Ser. No. 805,818 by Gary L. Driscoll filed of even date herewith.

In general, the polyesters suitable for use in the compositions of this invention can be defined as viscous liquids having a molecular weight in the range of 600 to 20,000 prepared by the copolymerization of the above-disclosed polymethylated muonic acids or their esters or mixtures thereof with polyethylene glycols having a molecular weight in the range of 100 to 1000.

By the term elastomer as herein disclosed is meant natural or synthetic polymers which exhibit the property of "long range elasticity." By long range elasticity is meant the ability of the polymer to undergo stretching to at least 150 to 200 percent of its original length and to retract very rapidly to virtually its original length when it is released. A full description of elastomers useful in the compositions of the present invention is disclosed in "The Encyclopedia of Chemistry," 2nd edition, Reinhold Publ. Co., New York, N.Y. (1966), pp. 359–362.

Included as elastomers are rubbers of either natural or synthetic origin.

By the term rubber as herein disclosed is meant natural or synthetic rubber that has been modified to increase its useful properties such as elasticity, toughness, resistance to abrasive wear, and others. The modification of the elastomer is accomplished usually by compounding or masticating the rubber with sulfur or other vulcanizing agents. The composition can also contain various other additives such as zinc oxide, carbon black, or other reinforcing pigments, fillers, softeners, extenders and antioxidants. The elastomer and additive composition is thereafter shaped and vulcanized. These compositions are chiefly used in tires, hose, belting, friction materials, containers, electrical insulating, and water proofing materials and can also be used in combination with textile fabrics and metals as well as other materials.

Examples of elastomers usable in the compositions of the present invention include natural and synthetic rubber compositions which are normally subject to ultraviolet initiated degradation. Natural rubber including *Hevea braziliensis* latex and synthetic rubber including butyl polymers, such as polybutene-1, polyisobutylene, polybutadiene, as well as styrene-butadiene copolymers (SBR), ethylene-propylene-dicyclopentadiene terpolymers, polyisoprene, neoprene (polychloroprene), acrylonitrile-butadiene polymers, among others, are included among the compositions of the present invention.

As a means of illustrating one mode of the present invention, the following evaluations are given. All parts as hereinafter disclosed are given as parts by weight.

EXAMPLE I

A sample of raw styrene-butadiene rubber (SBR) containing 24 weight percent polymerized styrene and having a Mooney viscosity of 50 was compounded and vulcanized in the following manner:

100 parts of SBR were banded on a standard rubber mill while maintaining roll temperatures at approximately 73° F. After 2–3 minutes of milling the SBR, 10 parts of zinc oxide, 10 parts of titanium dioxide, and 20 parts of a standard naphthenic rubber processing oil, 2.0 parts sulfur and 1.75 parts benzothiazyl disulfide were blended with the rubber and the whole composition was milled for about thirty minutes to provide complete dispersion of additives in the rubber. The rubber composition was thereafter sheeted to provide rubber specimens having the dimensions of 6 x 6 x .075 inches. The rubber sheets were subsequently vulcanized at a temperature of 300° F. for about 45 minutes. The vulcanized sheets were then quenched with cold water and dried.

The vulcanized rubber samples were thereafter evaluated for ultraviolet stability by exposing each sample to ultraviolet light for periods of 24, 48, and 72 hours in accordance with the procedures outlined in ASTM D915–55.

One noticeable effect of exposure of white rubber compositions to ultraviolet light is discoloration of the sample in the form of increased yellowness. The increase in intensity of the yellowness of the rubber sample is usually indicative of the increased degradation of the rubber initiated by ultraviolet light. The intensity of yellowness of the rubber samples herein tested were determined on a Photo Volt Corporation Model 610 Reflectometer having a standard blue filter. The results of this evaluation appear in the table under Example I. In the determination the intensity of yellowness is inversely proportional to the reflectance value shown on the Reflectometer. This Example I serves as a reference example illustrating one effect of ultraviolet light on an unstabilized elastomeric composition.

EXAMPLE II

A polyester of the dimethyl ester of trans-trans $\alpha,\alpha'$-dimethylmuconic acid was prepared as follows:

A solution of 1500 g. of cis-cis dimethylmuconic acid obtained by biological oxidation of p-xylene and dissolved in 10 liters of 6 N NaOH is refluxed for 24 hours, diluted with 5 volumes of distilled water, and brought to pH 3 with 12 N HCl. The solid which separates at this point is filtered off and dried; it contains about 80% of the trans-trans acid, with a lesser amount of the cis-trans acid and a minor amount of the cis-cis acid.

The crude product thus obtained is esterified by refluxing it (1400 g.) in 10 liters of methanol containing 10 cc. of concentrated $H_2SO_4$ until solution occurs. Cooling the reaction mixture yields the dimethyl ester of the trans-trans acid in substantially pure form (M.P. 102°–104° C.).

582 grams of the above-disclosed dimethyl $\alpha,\alpha'$-dimethyl trans-trans muconate, 1170 grams of polyethylene glycol having an average molecular weight of about 300 were blended and heated in a glass polymerization vessel under a nitrogen atmosphere until the entire blend becomes molten. The melt was thereafter maintained at 200° C. while 4.0 cc. of tetraisopropyl titanate catalyst was added and maintained at that temperature for 12 hours under continuous agitation. The resultant liquid product was vacuum distilled at 1 mm. Hg pressure for 3 hours. The residue recovered comprised 1500 grams of a thick viscous polyester liquid.

EXAMPLE III

A rubber composition identical to that of Example I was compounded and cured in the identical manner as Example I with the exception that 0.1 part of the polyester prepared as disclosed in Example II above was added to the rubber composition during the compounding step. This rubber sample was evaluated in the identical manner as the rubber compositions of Example I. The results of this evaluation appear in the table under Example III.

EXAMPLE IV

Example III was repeated with the exception that 1.0 part of the polyester disclosed in Example II was added to the rubber composition during the compounding step. The results of this evaluation appear in the table under Example IV.

EXAMPLE V

Example III was repeated with the exception that 5.0 parts of the polyester disclosed in Example II was added to the rubber composition during the compounding step. The results of this evaluation appear in the table under Example V.

EXAMPLE VI

Example II was repeated with the exception that 8.0 parts of the polyester disclosed in Example II was added to the rubber composition during the compounding step. The results of this evaluation appear in the table under Example VI.

EXAMPLE VII

Example II was repeated with the exception that 10.0 parts of the polyester disclosed in Example II was added to the rubber composition during the compounding step. The results of this evaluation appear in the table under Example VII.

TABLE

| | | Reflectance values after— | | | |
|---|---|---|---|---|---|
| | Parts of additive | No U.V. exposure | 24 hrs. U.V. exposure | 48 hrs. U.V. exposure | 72 hrs. U.V. exposure |
| Example: | | | | | |
| I | None | 91.0 | 37.5 | 19.0 | 18.5 |
| III | 0.1 | 91.0 | 48.0 | 29.0 | 27.0 |
| IV | 1.0 | 92.0 | 50.0 | 31.5 | 31.0 |
| V | 5.0 | 90.0 | 52.0 | 38.0 | 36.0 |
| VI | 8.0 | 90.0 | 68.0 | 50.0 | 49.0 |
| VII | 10.0 | 90.0 | 78.0 | 63.5 | 60.5 |

An ultraviolet stability evaluation of unstabilized SBR is represented by the data given in the table under Example I. The data given in the table under Examples III–VII when compared with Example I illustrate the substantial improvement achieved in ultraviolet stability of SBR by addition and dispersion of small quantities of a polyester prepared from the dimethyl ester of trans-trans α,α'-dimethylmuconic acid in the rubber composition prior to vulcanization of the composition.

As can be seen from the results of Example I given in the table, prolonged exposure to ultraviolet light reduces the reflectance value of unstabilized rubber indicating an increase in yellowness of the rubber. The more intense the yellowness of the rubber, the greater the degree of ultraviolet initiated degradation that has taken place in the rubber.

The rubber samples containing incremental quantities of one of the ultraviolet stabilizer compositions of the present invention exhibit a substantial decrease in measured yellowness intensity as compared to the same rubber unstabilized, and therefore demonstrate their improved resistance to ultraviolet initiated degradation.

The reflectance values for each sample given above was measured on a Photo Volt Corporation Model 610 Reflectometer having a tungsten lamp and a blue filter lense. The test comprises subjecting the sample to be tested to the photoelectric cell of the Reflectometer and reading the amount of reflectance for that sample directly from the scale of the galvanometer of the instrument.

In the above-given series of evaluations the photoelectric cell was adjusted for yellowness determinations in the following manner:

(a) A grey ceramic tristimulus color evaluation plaque having a blue color value of 48.0, a green color value of 45.0 and an amber color value of 44.0 was placed on the face of the photoelectric cell and the galvanometer was adjusted to a value of 50, and (b) A white ceramic tristimulus color evaluation reference plaque having a blue color value of 75.5, a green color value of 74.5 and an amber color value of 74.0 was placed on the face of the photoelectric cell and the galvanometer scale was adjusted to a reading of 100. Each sample tested was thereafter placed on the face of the photoelectric cell and the reflectance value for the sample was taken as a direct reading from the galvanometer scale. The values achieved by this method are relative values and provide a basis for comparison of intensity of yellowness of the samples. Another procedure which is equally useful in determining the yellowness of white rubber is disclosed in ASTM D1925–63T.

The present examples illustrate the evaluations on white pigmented rubber. However, any rubber containing any form of pigmentation filler, extenders or other additives normally associated with vulcanized rubber including carbon black can be used in the compositions of the present invention and achieve improved resistance to ultraviolet degradation.

Elastomeric compositions other than SBR can be combined with the ultraviolet stability improving additives disclosed hereinabove within the scope of the present invention to provide results analogous to those disclosed in said samples. Such compositions are included within the scope of the compositions of this invention.

Ultraviolet stability improving additives other than the polyester of the dimethyl ester of trans-trans α,α'-dimethylmuconic acid set forth in the examples given above can be substituted therefore in any of the elastomers disclosed and provide analogous results. Included among these additives are the polyesters prepared from any of the disclosed polyethylene glycols copolymerized with cis-cis, cis-trans and trans-trans isomers of any of the polymethylated muconic acids disclosed above as well as these isomers of the mono esters of each of these acids wherein the ester is a $C_1$ to $C_{20}$ hydrocarbyl group and also the diesters of each of these acids wherein each ester is a $C_1$ to $C_{20}$ hydrocarbyl group. Any combination of the above additives with any of the disclosed elastomers provide results analogous to those disclosed in the examples disclosed herein.

Elastomer compositions of any of the above-disclosed polymers in the aqueous latex emulsion state or as the uncured raw rubber precipitated from latex emulsions are also suitable as compositions which can be improved with respect to ultraviolet stability by the methods hereinabove disclosed. Raw rubber lattices containing an ultraviolet stability improving quantity of the polymethylated muconic acids and muconates hereinabove disclosed are included in the scope of the present invention.

The invention claimed is:

1. A composition having improved ultraviolet stability comprising an elastomer selected from the group consisting of natural rubber and synthetic rubber derived from an ethylenically unsaturated monomer containing an ultraviolet stability improving quantity of a polyester of a polymethylated muconic acid selected from the group consisting of α,α'-dimethylmuconic acid, α,β'-dimethylmuconic acid, α,α',β-trimethylmuconic acid, α,β,β'-trimethylmuconic acid, α,α',β,β'-tetramethylmuconic acid and mixtures thereof with a polyethylene glycol having a molecular weight in the range of 100 to 1000 said polyester having a molecular weight in the range of 600 to 20,000.

2. A composition according to claim 1 wherein the ultraviolet stability improving polyester is derived from the cis-cis isomer of said polymethylated muconic acids.

3. A composition according to claim 2 wherein the quantity of ultraviolet stability improving material is in the range of 2 to 10 weight percent.

4. A composition according to claim 3 wherein said polymethylated muconic acid is α,α'-dimethylmuconic acid.

5. A composition according to claim 4 wherein the elastomer is styrene-butadiene rubber.

6. A composition according to claim 4 wherein the elastomer is ethylene-propylene-dicyclopentadiene rubber.

7. A composition according to claim 1 wherein the ultraviolet stability improving polyester is derived from the cis-trans isomer of said polymethylated muconic acids.

8. A composition according to claim 7 wherein the quantity of ultraviolet stability improving material is in the range of 2–10 weight percent.

9. A composition according to claim 8 wherein said polymethylated muconic acid is α,α'-dimethylmuconic acid.

10. A composition according to claim 9 wherein the elastomer is styrene-butadiene rubber.

11. A composition according to claim 1 wherein the ultraviolet stability improving polyester is derived from the trans-trans isomer of said polymethylated muconic acids.

12. A composition according to claim 11 wherein the quantity of ultraviolet stability improving material is in the range of 2–10 weight percent.

13. A composition according to claim 12 wherein said polymethylated muconic acid is α,α'-dimethylmuconic acid.

14. A composition according to claim 13 wherein the elastomer is styrene-butadiene rubber.

References Cited

UNITED STATES PATENTS

| | | | |
|---|---|---|---|
| 3,244,668 | 4/1966 | Knapp et al. | 260—45.85 |
| 3,248,247 | 4/1966 | Heller et al. | 260—45.85 |
| 3,248,248 | 4/1966 | Coran et al. | 260—45.85 |
| 3,256,238 | 6/1966 | Anagnostopoulos | 260—45.85 |
| 3,256,312 | 6/1966 | Strobel et al. | 260—45.85 |
| 3,280,069 | 10/1966 | Knapp et al. | 260—45.85 |

DONALD E. CZAJA, Primary Examiner

V. P. HOKE, Assistant Examiner

U.S. Cl. X.R.

260—810, 814, 815